Figure 1:
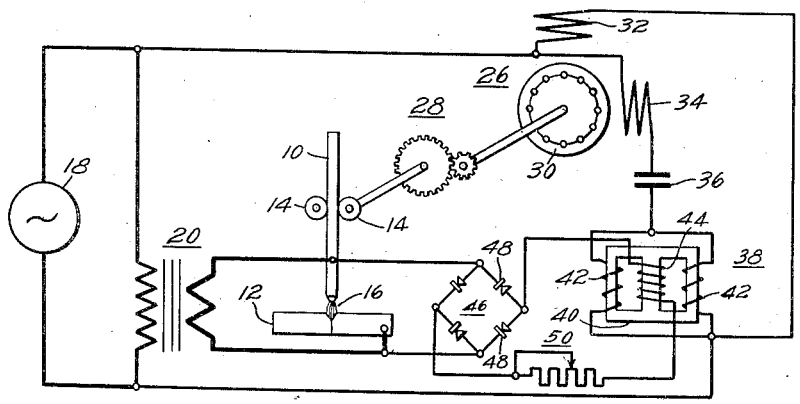

March 17, 1942.  J. H. BLANKENBUEHLER  2,276,644
WELDING SYSTEM
Filed Jan. 26, 1940

WITNESSES:
C. J. Weller.
F. V. Giolma

INVENTOR
John H. Blankenbuehler.
BY
Geo. Crawford
ATTORNEY

Patented Mar. 17, 1942

2,276,644

UNITED STATES PATENT OFFICE 2,276,644

WELDING SYSTEM

John H. Blankenbuehler, Edgewood, Pa., assignor to Westinghouse Electric & Manufacturing Company, East Pittsburgh, Pa., a corporation of Pennsylvania Application January 26, 1940, Serial No. 315,705

7 Claims. (Cl. 219—8)

My invention relates, generally, to welding systems, and it has reference, in particular, to automatic arc welding systems.

Generally stated, it is an object of my invention to provide in a simple and effective manner for controlling the operation of an alternating current electrode feed motor.

More specifically, it is an object of my invention to provide for feeding an arc welding electrode by means of a polyphase alternating current motor, and to control the rate and direction of electrode feed by varying the time phase relation of the currents supplied to the different phase windings of the motor from a single phase source.

Another object of my invention is to control the operation of a polyphase alternating current electrode feed motor by varying the time phase relation of the currents in the different phase windings in response to variations of conditions in an associated electrode circuit.

A further object of the invention is to control the speed and direction of operation of a polyphase alternating current electrode feed motor by means of variable reactance means responsive to conditions of an associated electrode circuit.

Yet another object of the invention is to utilize capacitance and inductance in varying proportions to control the time phase relation of the phase currents in a polyphase alternating current electrode feed motor, and control the relative proportions of capacitance and inductance in accordance with varying conditions of an associated electrode circuit.

Another object of the invention is to utilize a saturable reactor having a control winding energized in accordance with a condition of the electrode circuit for varying the time phase relation of the currents in the phase windings of a polyphase alternating current electrode feed motor so as to maintain a predetermined condition in the electrode circuit.

Other objects will, in part, be obvious, and will, in part, appear hereinafter.

In practicing my invention, the fusible electrode in an arc welding system may be fed relative to the work upon which the welding operation is to be performed by an alternating current feed motor having a plurality of phase windings positioned in spacial phase relation. The phase windings may be connected to a single phase source of alternating current and suitable means may be provided therewith for varying the time phase relation of the currents in the windings in order to control the speed and direction of operation of the feed motor. For example, a condenser may be connected in series circuit relation with one of the phase windings to normally produce a leading current therein and a saturable reactor having a control winding connected to a source of direct current potential which is responsive to a condition of the electrode circuit associated with the fusible electrode for controlling the saturation of the reactor may be provided for controlling the relative proportions of capacitive and inductive reactance connected with the said one phase winding so as to control the speed and direction of operation of the feed motor to maintain a predetermined arc condition.

Figure 2:
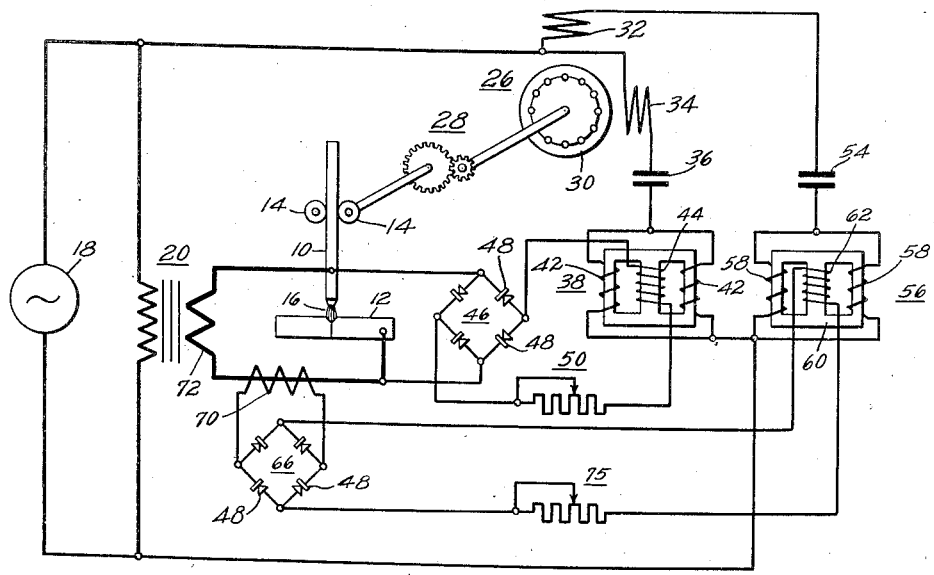

For a more complete understanding of the nature and scope of my invention, reference may be had to the following detailed description, which may be taken in connection with the accompanying drawing, in which:

Figure 1 is a diagrammatic view of an arc welding system embodying the principles of my invention; and Fig. 2 is a diagrammatic view of an arc welding system embodying a modification of the invention.

Referring particularly to Fig. 1, the reference numeral 10 denotes a fusible arc welding electrode, which may be fed relative to the work 12 upon which a welding operation is to be performed by means of feed rolls 14, to maintain an arc 16 with the work. Welding energy may be supplied to the electrode 10 from any suitable source such as, for example, the alternator 18 which may be connected to the electrode 10 by means of a transformer 20.

The feed rolls 14 may be driven in any desired manner, being, for example, connected to an alternating current feed motor 26 by means of suitable reduction gears 28. The feed motor 26 may, for example, comprise a rotor 30 of the squirrel-cage type, and phase windings 32 and 34 which are associated therewith in spacial phase relation. The motor windings 32 and 34 may, for example, be displaced approximately 90 electrical degrees from each other, and energized from the source of alternating current 18.

In order to provide a time phase relation between the currents in the motor windings 32 and 34, when they are energized from the source 18, so as to produce a rotating magnetic field, suitable means may be utilized for altering the time phase relation of the currents in the windings relative to each other, so as to produce a time phase angle therebetween of approximately 90 electrical degrees. For example, a condenser 36 may be connected in series circuit relation with the motor winding 34 so as to make the current in the windings 34 capacitive or "leading" relative to the current in the winding 32.

With a view to varying the time phase relation of the currents in the motor windings 32 and 34 relative to each other, so as to control the operation of the feed motor 26, means such as the saturable reactor 38 may be connected in circuit relation with the motor winding 34. The reactor 38 may, for example, comprise a three-legged magnetic core 40 having alternating current reactor windings 42 positioned on the outer legs thereof and connected in series circuit relation with the condenser 36 and motor winding 34, and a control winding 44 positioned on the middle leg of the core 40 for controlling the inductive reactance of the reactor.

In order to control the inductive reactance of the reactor 38 so as to vary the time phase relation of the currents in the motor windings 32 and 34 in accordance with the conditions in the electrode circuit associated with the fusible electrode 10, suitable means may be provided for applying to the control winding 44 a direct current voltage which is responsive to a condition in the electrode circuit so as to vary the saturation of the core 40. For example, a bridge circuit 46 of unidirectional current devices 48 may be connected across the arc 16 between the electrode 10 and the work 12 to rectify the alternating current voltage impressed between the electrode and the work. The direct current terminals thereof may be connected to the control winding 44 through a variable control resistor 50, which is provided for initially adjusting the inductance of the saturable reactor 38 so as to secure such variations in the time phase angle between the currents in the motor windings 32 and 34 as to effect the operation of the feed motor 26 to maintain a predetermined arc voltage between the electrode and the work.

By properly proportioning the reactance of the condenser 36 and the saturable reactor 38, the time phase relation of the currents in the motor windings 32 and 34 may be suitably adjusted so that when a predetermined normal arc voltage exists across the arc 16 between the electrode 10 and the work 12, the current in the winding 34 leads the current in the winding 32, and the motor 26 operates to feed the electrode 10 towards the work at a predetermined rate. If the voltage of the arc 16 becomes greater than the predetermined normal value, the voltage impressed on the control winding 44 of the saturable reactor 38 by the rectifier circuit 46 increases, and the reactor tends to become saturated, thus reducing its reactance, and allowing the condenser 36 to predominate. The current in the motor winding 34 becomes more "leading" with respect to the current in the winding 32, so that the torque of the motor increases, thus tending to feed the electrode 10 toward the work at an increased rate of speed to reduce the length of the arc 16 and lower the arc voltage to the normal value.

Should the voltage of the arc 16 become less than the predetermined normal value, the direct current voltage impressed on the control winding 44 of the saturable reactor 38 decreases. The inductive reactance of the reactor 38 increases accordingly, and the angle of lead between the currents in the motor windings 34 and 32 is reduced, so that the torque of the motor is reduced, and the electrode 10 is fed toward the work at a reduced rate of speed. If the arc voltage becomes exceedingly low, or is reduced to zero, the inductive reactance of the reactor 38 becomes sufficiently high to overcome the effect of the condenser 36, so that the current in the motor winding 34 "lags," with respect to the current in the motor winding 32. Under these conditions the torque of the motor 26 is reversed, and the electrode 10 is withdrawn from the work to reestablish the desired normal arc voltage.

Referring to Fig. 2 of the drawing, the welding system therein illustrated is substantially the same as the welding system shown in Fig. 1, except that additional means is provided for controlling the time phase relation of the current in the motor winding 32, as well as that of the current in the motor winding 34.

By providing suitable means for varying the time phase relation of the current in the motor winding 32 in the opposite sense to that of the current in the motor winding 34, the sensitivity of the electrode feed motor control system may be greatly increased. For example, a condenser 54 may be connected in series circuit relation with the motor winding 32. A saturable reactor 56 may be provided, having alternating current windings 58 positioned on a magnetic core 60 and connected in series circuit relation with the motor winding 32 and condenser 54 and a direct current control winding 62 positioned on the middle leg of the reactor core 60 for controlling the inductance of the reactor by varying the degree of saturation thereof.

In order to vary the time phase relation of the current in the motor winding 32 in the opposite sense to that of the current in the motor winding 34, suitable means may be provided for varying the reactance of the reactor 56 in the opposite sense to that of the reactor 38. For example, the reactor may have a control winding normally excited so as to effect saturation of the core 60, and an opposing control winding energized in accordance with the voltage of the arc, or means may be provided for applying to the control winding 62 a direct current control voltage which varies substantially inversely with respect to the voltage of the arc 16. For example, a rectifying bridge circuit 66 of unidirectional current devices 48 may be connected to the secondary winding 70 of a current transformer 72, the primary winding of which is connected in series circuit relation with the electrode 10 and the work 12. The direct current terminals of the rectifier circuit 66 may be connected through a variable control resistor 75 to the control winding 62 of the reactor 56.

When the voltage of the arc 16 exceeds a predetermined normal value, the direct current control voltage impressed on the control winding 44 of the reactor 38 by the rectifier circuit 46 increases. The reactor 38 tends to become saturated and the condenser 36 becomes more predominating in the circuit of the motor winding 34, so that the current therein becomes more "leading." At the same time that the voltage of the arc 16 increases the current in the electrode circuit tends to decrease. The voltage applied to the control winding 62 of the reactor 56 by the rectifier circuit 66 therefore decreases. The inductance of the reactor 56 increases accordingly, and tends to predominate in the circuit of the motor winding 32. The current in the motor winding 32 becomes therefore, more "lagging." The effect of the changes in the time phase relations of the currents in the motor windings 32 and 34 are, therefore, additive in tending to increase the rate of feed of the electrode 10. If the voltage of the arc 16 becomes less than a predetermined normal value, the time phase relation of the currents is altered in the opposite sense and the rate of electrode feed is reduced. If the arc becomes sufficiently short, the time phase relations of the currents in the motor windings 32 and 34 will change sufficiently to reverse the direction of operation of the feed motor so as to withdraw the electrode from the work, and thus reestablish the desired length of arc.

From the above description and the accompanying drawing, it will be apparent that my invention provides a simple and effective system for feeding a fusible electrode in an arc welding system. By utilizing a polyphase alternating current electrode feed motor and varying the time phase relation of the currents in the phase windings in accordance with a condition or conditions of the electrode circuit, a convenient and accurate control of the rate of electrode feed may be readily maintained. Such an electrode control system is readily adaptable for use with either alternating current or direct current welding circuits, wherever a single phase source of alternating current is available. The control system embodying the features of my invention is, furthermore, simple and inexpensive to manufacture, and economical to operate.

Since certain changes may be made in the above description and different embodiments of the invention may be made without departing from the spirit thereof, it is intended that all matter contained in the above description or shown in the accompanying drawing shall be considered as illustrative and not in a limiting sense.

I claim as my invention:

1. The combination in an alternating current control system for an alternating current motor operable to maintain a predetermined condition in a circuit and having one phase winding disposed to be connected to a substantially constant source of alternating current excitation, and an additional phase winding for the motor positioned in spacial phase relation to the said one winding, of means for providing a phase shift in the current of the additional phase winding with respect to the current in the said one phase winding in one sense, and variable reactance means connected in series circuit relation with the additional phase winding having a direct current control winding energized from the circuit to vary the phase angle of the current in said winding relative to the current in the said one phase winding in the opposite sense.

2. The combination with an alternating current motor having a plurality of windings positioned in spacial phase relation disposed to be connected to a single phase source, of a condenser connected in series circuit relation with one of the windings to provide a normal time phase relation between the currents in the windings, and a saturable reactor connected in series circuit relation with the condenser having a direct current control winding energizable to vary the time phase relation of the currents in the said windings to control the operation of the motor.

3. In an automatic regulating system, in combination, an alternating current motor connected to an alternating current source operable to vary the voltage of a circuit connected to the alternating current source, said motor having a pair of windings having a predetermined spacial phase relation and disposed to be connected to the source, a condenser connected in series circuit relation with one of the motor windings to provide a predetermined time phase relation between the currents in the motor windings, a reactor operable to reverse the time phase relation between the currents having an alternating current winding connected in circuit relation with the condenser and said one motor winding and a direct current control winding, and means connected to the control winding for applying thereto a direct current control voltage responsive to the voltage of the circuit for varying the time phase relation of the currents in the motor windings.

4. The combination in an electric arc welding system having an electrode circuit for connecting a fusible electrode to a source of alternating current, of an alternating current feed motor operatively connected to the electrode, a plurality of phase windings for the motor displaced approximately ninety electrical degrees spacially and disposed to be energized from the source, a plurality of variable reactance means connected in series circuit relation with the phase windings for separately controlling the time phase relation of the currents therein, circuit means for controlling one of the reactance means connected with one phase winding to vary the time phase relation of the currents in the windings in accordance with the voltage of the electrode circuit, and additional circuit means for controlling another of the reactance means to effect a change in the phase relation of the currents in the phase windings in the same sense and maintain predetermined conditions of arc voltage and current.

5. In an electric arc welding system, in combination with a fusible electrode connected to a source of alternating current by an electrode circuit, an alternating current feed motor having a plurality of phase windings positioned in spacial phase relation and disposed to be energized from the source, a plurality of reactance devices connected to control the time phase relation of the currents in said phase windings, means for controlling one of the reactance devices connected with one of the phase windings to vary the time phase relation of the currents in the windings in accordance with the voltage of the electrode circuit, and means for controlling one of the reactance devices connected with another of the phase windings for additively varying the time phase relation of the currents in the windings in accordance with the curernt in the welding circuit, said means being effective to control the feed motor to maintain a predetermined length of welding arc.

6. An electric arc system comprising, an alternating current feed motor for feeding a fusible electrode in an arc circuit, said motor having a plurality of windings having a spacial phase relation and disposed to be energized from an alternating current source, a condenser connected in series with one of the windings, a variable reactor connected in series circuit relation with the condenser having a control winding, and means for applying a direct current voltage to the control winding proportional to the arc voltage of the circuit effective to control the inductance of the reactor so as to control the direction of rotation and speed of the feed motor to maintain a predetermined voltage across the arc.

7. The combination with a fusible electrode in an electrode circuit, of a polyphase electrode feed motor having a two-phase winding connected to a single phase source of alternating current, a condenser connected in series circuit relation with each phase winding, a saturable reactor connected in series circuit relation with each condenser having a direct current control winding, circuit means for applying a direct current voltage to the control winding of one of the reactors responsive to the voltage of the electrode circuit, and circuit means for applying a voltage to the control winding of the other reactor responsive to the current in the electrode circuit, said reactors being additively effective to vary the time phase relation of the currents in the phase winding so as to control the operation of the feed motor in accordance with arc conditions in the electrode circuit.

JOHN H. BLANKENBUEHLER.